(12) United States Patent
Sakamoto et al.

(10) Patent No.: US 7,950,041 B2
(45) Date of Patent: *May 24, 2011

(54) BROADCASTING FOR BROWSING THE WEB

(75) Inventors: Yoshifumi Sakamoto, Shiga-ken (JP); Masahiro Hori, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 12/334,448

(22) Filed: Dec. 13, 2008

(65) Prior Publication Data

US 2009/0100488 A1    Apr. 16, 2009

Related U.S. Application Data

(63) Continuation of application No. 09/912,109, filed on Jul. 24, 2001, now Pat. No. 7,478,417.

(30) Foreign Application Priority Data

Jul. 31, 2000  (JP) .................................. 2000-231757

(51) Int. Cl.
  *H04N 7/10*    (2006.01)
  *H04N 5/445*   (2006.01)
  *H04N 7/173*   (2006.01)

(52) U.S. Cl. .............. 725/112; 725/32; 725/36; 725/52; 725/60; 725/61; 725/109; 725/110; 725/114

(58) Field of Classification Search ................ 725/32, 725/36, 109, 110, 112, 114, 144, 147
See application file for complete search history.

(56) References Cited

U.S. PATENT DOCUMENTS

| | | | |
|---|---|---|---|
| 5,973,681 A * | 10/1999 | Tanigawa et al. | 715/716 |
| 6,163,803 A * | 12/2000 | Watanabe | 709/217 |
| 6,184,878 B1 * | 2/2001 | Alonso et al. | 725/109 |
| 6,381,748 B1 * | 4/2002 | Lin et al. | 725/109 |
| 6,642,938 B1 * | 11/2003 | Gilboy | 715/721 |
| 6,886,178 B1 * | 4/2005 | Mao et al. | 725/52 |
| 7,089,579 B1 * | 8/2006 | Mao et al. | 725/109 |
| 7,320,134 B1 * | 1/2008 | Tomsen et al. | 725/32 |
| 7,367,042 B1 * | 4/2008 | Dakss et al. | 725/60 |
| 7,478,417 B2 * | 1/2009 | Sakamoto et al. | 725/112 |
| 2002/0007494 A1* | 1/2002 | Hodge | 725/109 |
| 2005/0149981 A1* | 7/2005 | Augenbraun et al. | 725/112 |

FOREIGN PATENT DOCUMENTS

| | | |
|---|---|---|
| JP | 10-083172 | 3/1998 |
| JP | 11-112914 | 4/1999 |

* cited by examiner

*Primary Examiner* — Son P Huynh
(74) *Attorney, Agent, or Firm* — Michael J. Buchenhorner; Vazken Alexanian

(57) ABSTRACT

A broadcast system includes a transmitting unit configured for: receiving a web page as input; converting the web page into video image data; and providing a link to the video image data on a basis of a link provided to the web page; an encoder for compressing the video image data; and a receiving unit for receiving the compressed video data; decoding the compressed video data; and directly transmitting the decoded video data to a video display device, without requiring a browser application.

11 Claims, 12 Drawing Sheets

Prior Art

Prior Art

Prior Art

BROADCASTING FOR BROWSING THE WEB

CROSS-REFERENCE TO RELATED APPLICATIONS

This application is a continuation of, and claims priority from, commonly-owned, co-pending U.S. patent application Ser. No. 09/912,109, filed on Jul. 24, 2001.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention relates to a broadcast system for browsing the Web using the broadcast system.

BACKGROUND OF THE INVENTION

The presently available digital broadcast includes a communications satellite (CS) broadcast, cable broadcast, Internet broadcast, and the like. These digital broadcasts are received by a set-top box (STB), for example. An STB, which is connected to a television, has a function of receiving and converting video signals and an interface for connecting a telephone line and a personal computer.

FIG. 5 is a schematic diagram of a transmitting unit 10 and a receiving terminal 20 for digital broadcast. The transmitting unit 10 transmits multiplex data (MPEG2-TS), in which video and audio data, computer program, EPG (electronic program guide) data are combined, to the receiving terminal 20. The transmitting unit 10 includes a video server 14 for compressing video and audio data and an application server 12, or a general purpose computer. The receiving terminal 20 includes an STB 22 for receiving a digital data broadcast and a television 24 having a visual output unit and audio output unit. The STB 22 may be built into the television 24.

As shown in FIG. 6(a), the video server 14 comprises MPEG 2 (Motion Picture Expert Group phase 2) encoders 30 which compress video and audio data 1, 2, 3, and 4 including audio data (audio 1, 2, 3, and 4) and video data (video 1, 2, 3, 4) in accordance with the MPEG2 standard; a multiplexer 32 which multiplexes the compressed video and audio data 1, 2, 3 and 4, EPG and the like; and a transmitter 34 for transmitting the multiplexed data (MPEG2-TS). FIG. 6(b) shows an overview of the data (MPEG2-TS) transmitted by the transmitting unit 10. In FIG. 6(b), a plurality of MPEG 2 data are included in the same frequency band in a time-division manner.

As shown in FIG. 7, the STB 22 comprises a receiver 40 for receiving the data (MPEG2-TS) transmitted from the transmitting unit 10; a demultiplexer 42 for separating the multiplexed data (MPEG2-TS); an MPEG2 decoder 44 for decoding the video and audio data compressed in the MPEG2 standard; a video decoder 46 for converting the decoded video data into a video signal for television display; an input device 52 for operating the STB 22; a communication device 48 for communicating the transmitting unit 10 via communication lines such as telephone lines; and a microprocessor unit (MPU) 50 for controlling these devices included in the STB 22.

In the case of CS broadcasting, the receiver 40 receives digital broadcast using a parabolic antenna. The received data (MPEG 2-TS), which is the multiplexed data, is separated into video and audio data by the demultiplexer 42. The video and audio data are transmitted to the MPEG2 decoder 44, and the EPG data is transmitted to the MPU 50. The video and audio data are decoded in the decoder 44. The volume of the decoded audio data is adjusted in an amplifier (not shown), and then sent to a speaker integrated in the television 24, for example. The decoded video data is converted into video signals for television display, and then sent to the television 24.

The EPG data transmitted to the MPU 50 is stored in a memory (not shown). The input device 52 is used for selecting a program to watch, changing the display of the EPG, and so on. For example, when an operation button of the input device 52 is pushed, the MPU receives the information that the button has been pushed. For example, when a program to watch is selected, the MPU 50 changes the MPEG2 data transmitted from the demultiplexer 42 to the MPEG2 encoder 44 to the program data selected in the above step. For example, when display control of the EPG data is performed in the input device 52, the MPU 50 transmits the EPG data to the video encoder 46. In the encoder 46, the EPG data is converted into video signals for television display, and then it is displayed on the screen of the television 24. The MPU 50 transmits watched program information to the transmitting unit 10 via the communication device 48. The application server 12 receives the watched program information and then calculates a viewing fee on the basis of the watched program information.

In these days, STBs having the function of not only receiving digital broadcast, but also browsing the Web on the Internet are becoming increasingly common. FIG. 8 is an overview of the connection between the Internet 16 and a receiving terminal 20 and a transmitting unit 10 in a digital broadcast system. Web data is transmitted from the Internet 16 to the receiving terminal 20 via the transmitting unit 10. The term "web data" used herein includes web page data such as HTML (Hyper Text Markup Language) file, image file, audio file and the like. The image file includes still picture and motion picture.

FIG. 9(a) shows an example of a web page 60. The web page 60 includes a picture 62, characters 64, and links 70, 72, and 74. The links 70, 72, and 74 are linked to other web pages. As shown in FIG. 9(b), links are provided to diagonally shaded areas 82, 84, and 86. Selecting one of the links 70, 72, and 74 by clicking on it, the user can browse a web page linked to the selected link.

As shown in FIG. 10(a), the web data transmitted from the Internet 16 to the application server 12 is sent to the multiplexer 32 in the video server 14. The web data, EPG data, MPEG2 data, and the like are then multiplexed and sent to the STB 22. An example of the transmitted data (MPEG2-TS) included in the same frequency band in a time-division manner is shown in FIG. 10(b).

As shown in FIG. 11, the STB 22 receives the web data (MPEG2-TS) transmitted from the transmitting unit 10. The received data is separated in the demultiplexer 42, and then transmitted to the MPU 50. The MPU 50 activates a web browser (a software for browsing the Web), and transmits graphic output of a web page to the television 24 via the video encoder 46. An image 80 shown in FIG. 12(a), which is displayed by the web browser, is converted into video signals, and then sent to the television 24. The volume of audio data is adjusted in an amplifier (not shown), and then sent to the television 24.

The input device 52 can be used for selecting one of the links by positioning a cursor 76 shown in FIG. 12(b) in the link and clicking a mouse button, for example. The function of selecting a link using a cursor is provided to the web browser, and the selection of a link is executed by the MPU 50. The MPU 50 sends selected link information to the transmitting unit 10 via the communication device 48. The application server 12 receives the selected link information from the receiving terminal 20, and requests the Internet 16 to transfer a web page linked to this link. When the requested web page is transferred from the Internet 16 to the application server 12, the server 12 sends the web page to the receiving terminal 20 in the same manner as described above.

As stated above, it is possible to browse the Web using an STB. However, as compared to the case where digital broadcast is received, a higher-speed MPU and a larger-capacity memory must be used when the web browser is used. In addition, since there is little compatibility between the MPUs and between the operating systems (OS) used in various STBs, the web browsers may often vary among the STBs. Even if the same web browsers are used in the STBs, functions may vary among STBs due to the addition of function enhancement software such as plug-in software. Thus, the variations between the web browsers may cause a failure of displaying a web page on the screen.

SUMMARY OF THE INVENTION

Briefly, according to an embodiment of the invention, a broadcast system includes a transmitting unit configured for: receiving a web page as input; converting the web page into video image data; and providing a link to the video image data on a basis of a link provided to the web page; an encoder for compressing the video image data; and a receiving unit for receiving the compressed video data; decoding the compressed video data; and directly transmitting the decoded video data to a video display device, without requiring a browser application.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
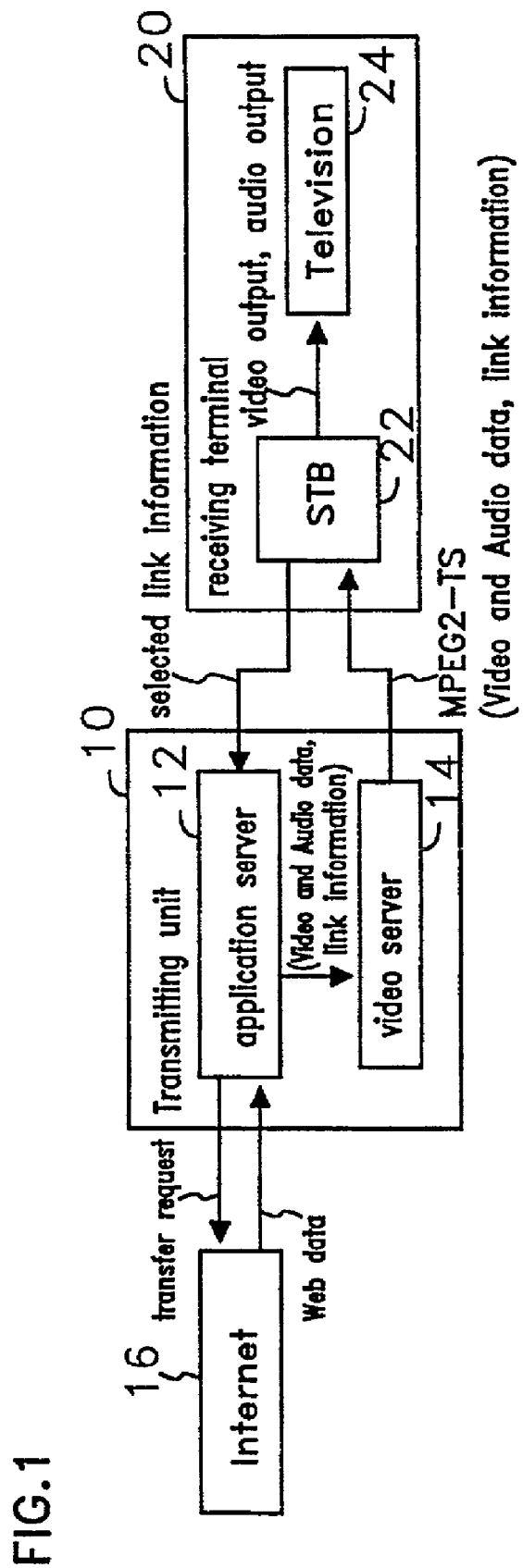
FIG. 1 is a block diagram showing an example of a broadcast system including a transmitting unit and a receiving terminal connected to the Internet according to the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a system for browsing the Web without using a web browser. In an example embodiment a digital broadcast system of the present invention includes (a) a transmitting unit comprising means for converting a web page from the Internet into video data and providing a link to the video data on the basis of a link provided to the web page; means for compressing the video data in accordance with a predetermined compression scheme; and means for transmitting the compressed video data and information about the link, and (b) a receiving unit comprising means for sending the received data to a video display device; and means for establishing an association between the link provided to the video data and a position of a cursor in the video data transmitted to the video display device.

The present invention also provides a method for browsing the Web using the digital broadcast system including the steps of: converting a web page transmitted to the transmitting unit from the Internet into video data; compressing the video data in accordance with a predetermined compression scheme; transmitting the compressed video data; and receiving and decoding the transmitted video data using the receiving unit to transmit the data to the video display device.

In one embodiment the step of compressing video data includes: converting a web page transmitted to the transmitting unit from the Internet into video data and transmitting the data; compressing the video data in accordance with the predetermined compression scheme; providing a link to the video data on the basis of a link provided to the web page, and transmitting the compressed video data and information about the link.

The step of receiving and encoding the transmitted video data includes: decoding the received data; transmitting the decoded data to the video display device; and establishing an association between the information about the link provided to the received video data and a position of a cursor in the video data transmitted to the video display device.

In the broadcasting system according to the present invention, a web page is converted into video image data in the transmitting unit, and compressed in the MPEG2 encoder to transmit to the receiving terminal. In the receiving terminal, the MPEG2 decoder decodes the video data. Since the MPEG2 decoder is used for displaying the web page, there is no need to use a web browser, so that neither a conventional high-speed MPU nor a high-capacity memory is necessary.

In the method for browsing the Web in the digital broadcasting system according to the present invention, video data into which a web page is converted is compressed in accordance with the MPEG 2 standard and then transmitted. The compressed data can be decoded by the MPEG2 decoder. Since the MPEG2 decoder is used for displaying the web page, there is no need to use a web browser, so that neither a conventional high-speed MPU nor a high-capacity memory is necessary.

Figure 8:
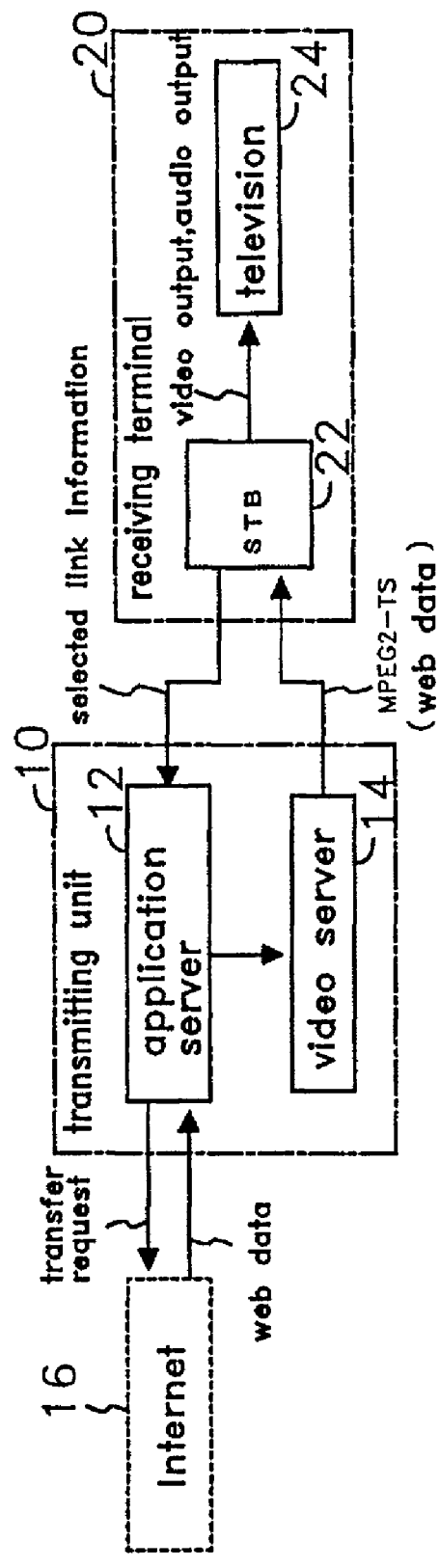
FIG. 8 is a block diagram showing an overview of a receiving terminal connected to the Internet via the transmitting unit.
Figure 9A:
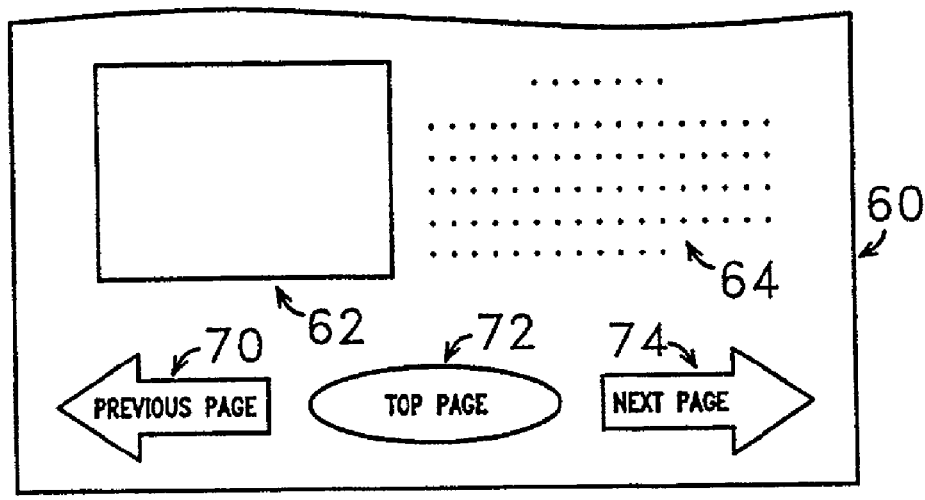
FIG. 9(a) shows an example of a web page.

In the following embodiments, a transmitting unit 10 and a receiving terminal 20 included in the broadcast system of the present invention is may be the same as the conventional ones (shown in FIG. 8), as shown in FIG. 1. An application server 12 in the transmitting unit 10 shown in FIG. 1 converts a web page 60 shown in FIG. 9(a) transmitted from the Internet 16 into video data of an image 80 shown in FIG. 12(a) and sends the video data. Then, the server 12 provides links to the image 80 on the basis of the links 70, 72, and 74 provided to the web page 60.

Figures 2A, 2B:
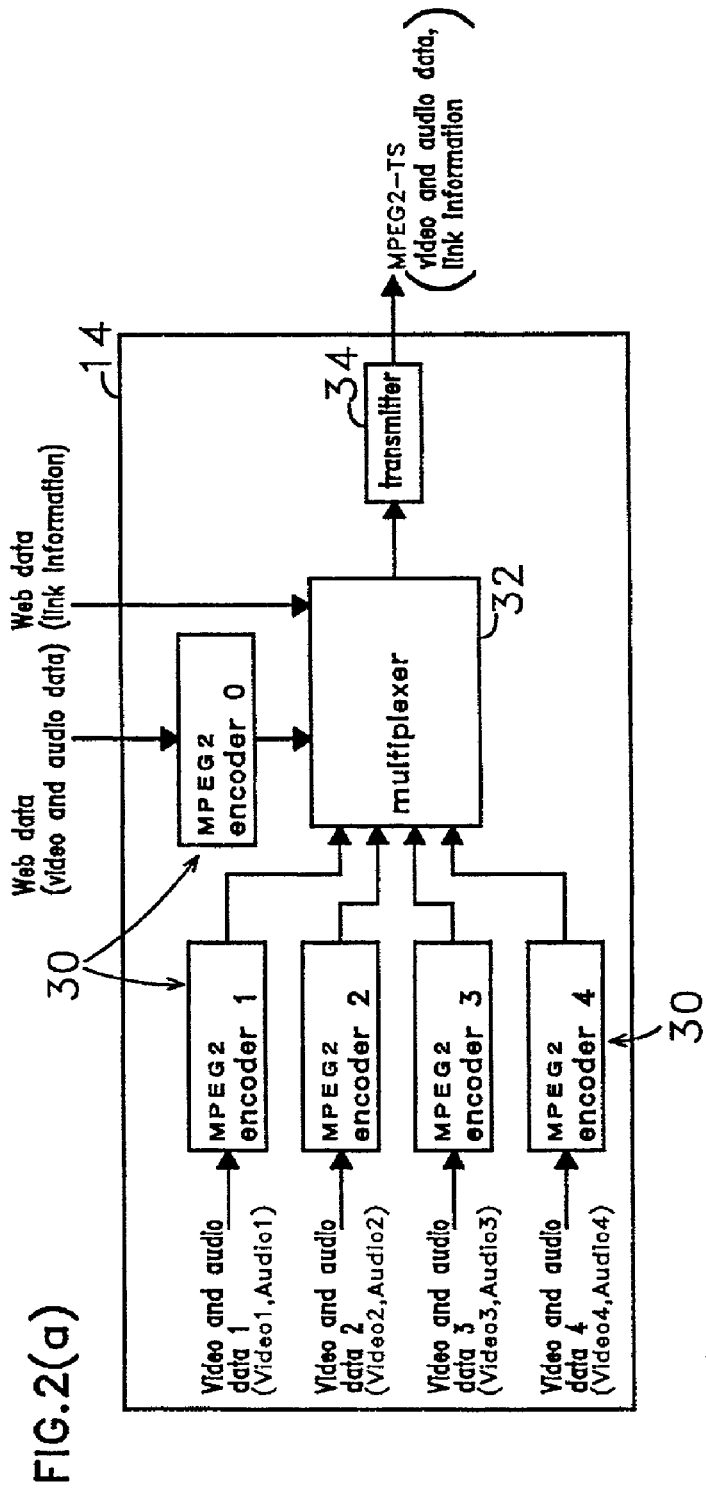
FIG. 2(a) is a block diagram showing an example of a video server included in the transmuting unit shown in FIG. 1(a)
FIG. 2(b) shows an example of an MPEG2-TS shown in FIG. 2(a)
Figure 3A:
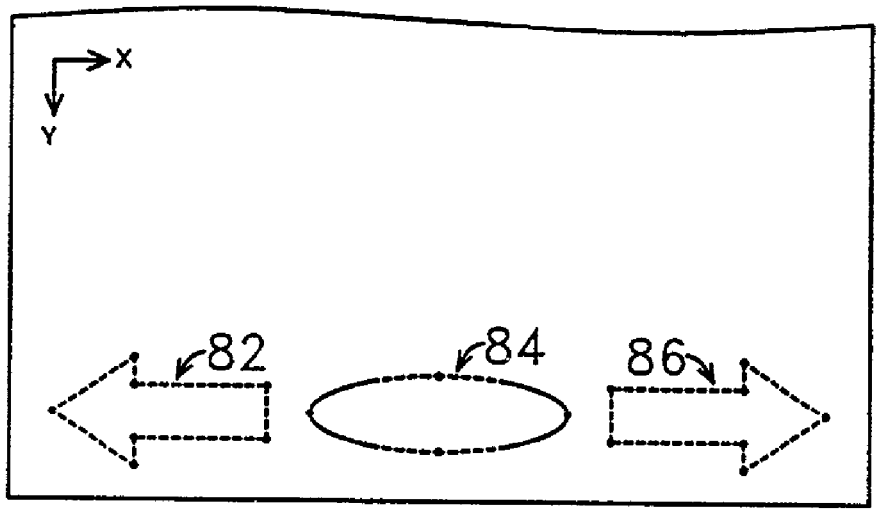
FIG. 3(a) shows an example of link information.
Figure 9B:
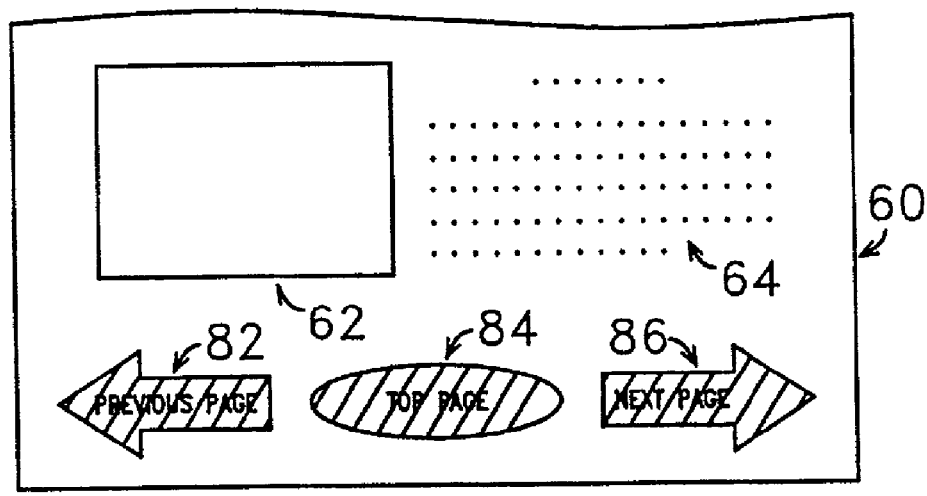
FIG. 9(b) shows link areas established in the web page shown in FIG. 9(a)

Specifically, a web browser is activated on the application server 12, and, as shown in FIG. 2(a), the video data of the image 80 is sent to an MPEG2 encoder 0 of a video server 14 as in the case of a video data being sent to a display screen, and then compressed in the same manner that conventional video and audio data 1, 2, 3, and 4 is compressed. When links are set at hatched areas 82, 84, and 86 of the web page 60 shown in FIG. 9(b), contour coordinate data of the areas 82, 84, and 86 are extracted by the application server 12 as shown in FIG. 3(a).

Figure 3B:
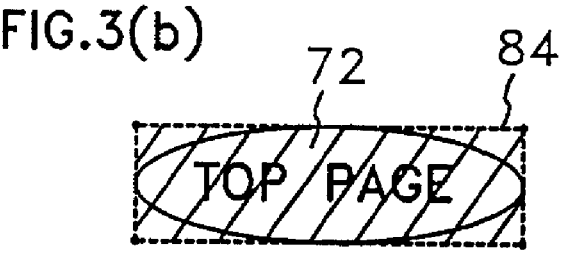
FIG. 3(b) shows another example of a link area.

A link area is often rectangular or simple geometric in shape. Especially, a link area provided to a word or phrase is rectangular in shape. When a link area is rectangular in shape, the link area can be described using coordinates of the four vertices of the area. When a link area is shaped like an arrow, coordinate data of seven vertices of the area are extracted. When a link area is of a complex shape such as oval, a rectangular area 84 circumscribing the area, shown in FIG. 3(b), may be considered as a link area. Most of link areas are defined in an HTML file, so that coordinate data can be extracted from the HTML file.

The link areas 82, 84, and 86 are linked to other web pages and the like. While extracting coordinate data concerning the above-described areas 82, 84, and 86, the application server 12 generates link information including addresses of web pages linked to the areas 82, 84, and 86. Thus, link information containing coordinate data of all the link areas within a web page and addresses of web pages linked to these areas are generated. The link information is generated on the basis of coordinate data contained in the HTML file, and sent to a multiplexer 32 of the video server 14.

A receiving terminal 20 shown in FIG. 1 according to the present invention outputs the video data of the image 80 to a television 24. An MPU 50 of an STB 22 shown in FIG. 4 establishes an association between the link information of the video data of the image 80 and a position of a cursor 76 in the video data of the image 80. Specifically, the terminal 20 compares a position coordinate of the cursor 76 with coordinates of points included in the areas 82, 84, and 86.

Figure 3C:
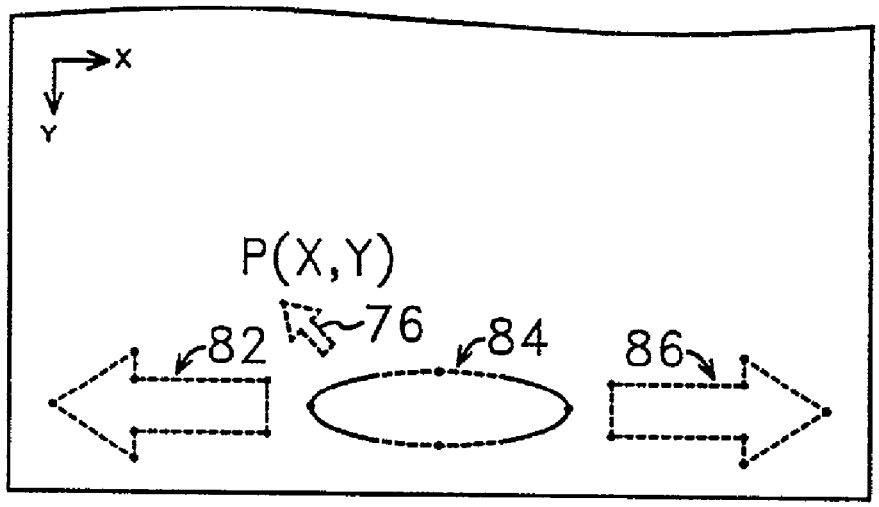
FIG. 3(c) shows an association between a cursor position and a link area in an MPU included in an STB.

For example, as shown in FIG. 3(c), it is determined whether or not a coordinate P(X,Y) of the cursor 76 is positioned in the area 82, 84, or 86. When the MPU 50 determines that the coordinate P(X,Y) of the cursor 76 is positioned in the area 82, 84, or 86, the MPU 50 inform the user about that by changing the appearance of the cursor 76 or the like. In much the same fashion as a conventional web browser, a desired link can be selected by moving the cursor 76 using the input device 52.

Next, an example method for browsing the Web using such digital broadcast system will be described. The web page 60 is transferred from the Internet 16 to the application server 12, and the application server 12 sends the video output data (80) of the web page 60 to the video server 14. Where the web page 60 also includes voice data, the application server 12 also sends the audio output data to the video server 14. Audio and video data are received by the MPEG2 encoder 0 of the video server 14. In the same manner that video data (Video 1, 2, 3, and 4) and audio data (Audio 1, 2, 3, and 4) are compressed, the MPEG2 encoder 0 compresses audio and video data of the image 80 in accordance with the MPEG 2 standard.

When the application server 12 sends the video data of the image 80, the application server 12 extracts link areas 82, 84, and 86 on the basis of the links 70, 72, and 74 provided to the web page 60, and generates link information including web addresses linked to the links 70, 72, 74 provided to the web page 60 and data defining the link areas 82, 84, and 86 on the image 80.

Figure 10A:
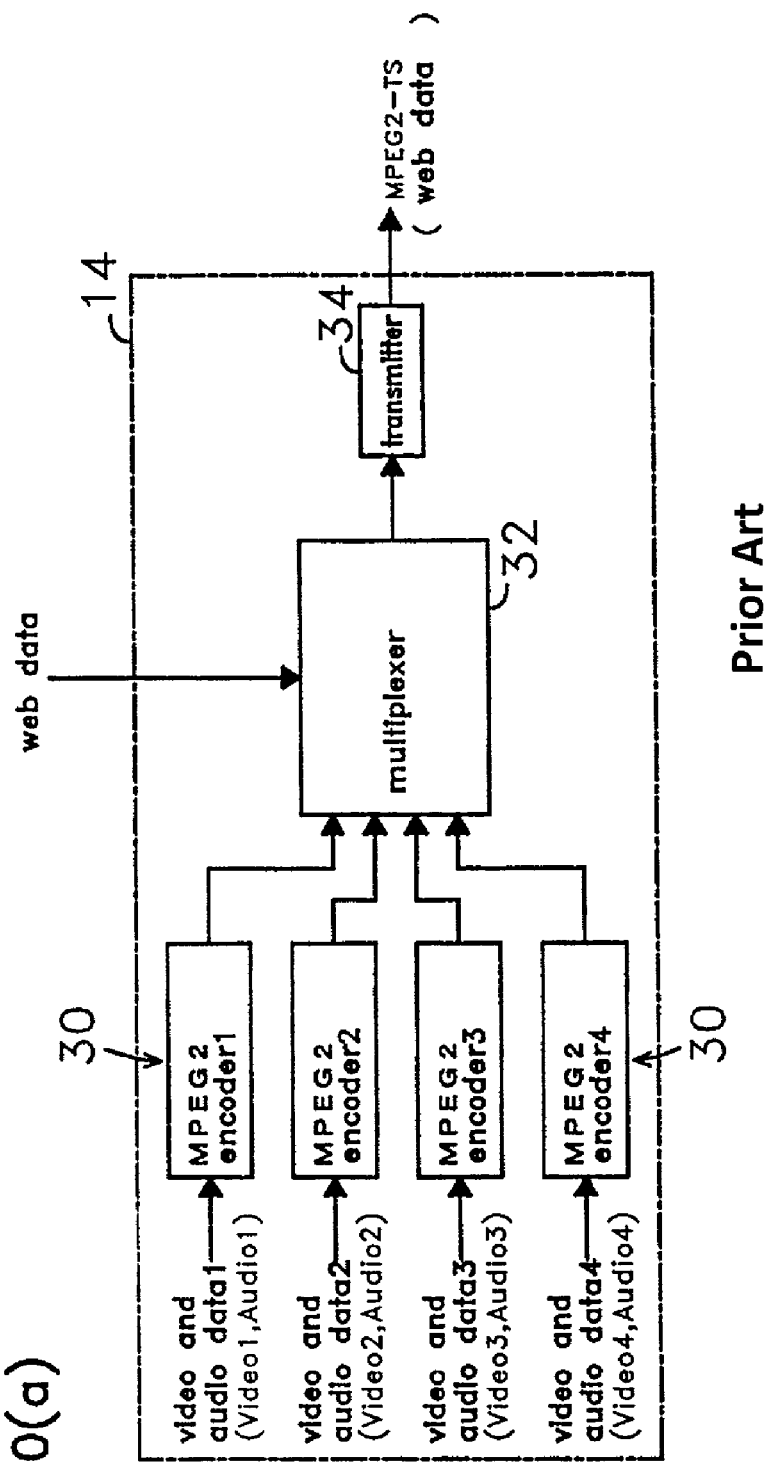
FIG. 10(a) is a block diagram of a conventional video server in the transmitting unit shown in FIG. 8.
Figure 10B:
FIG. 10(b) is an example of an MPEG2-TS shown in FIG. 10(a).
Figure 11:
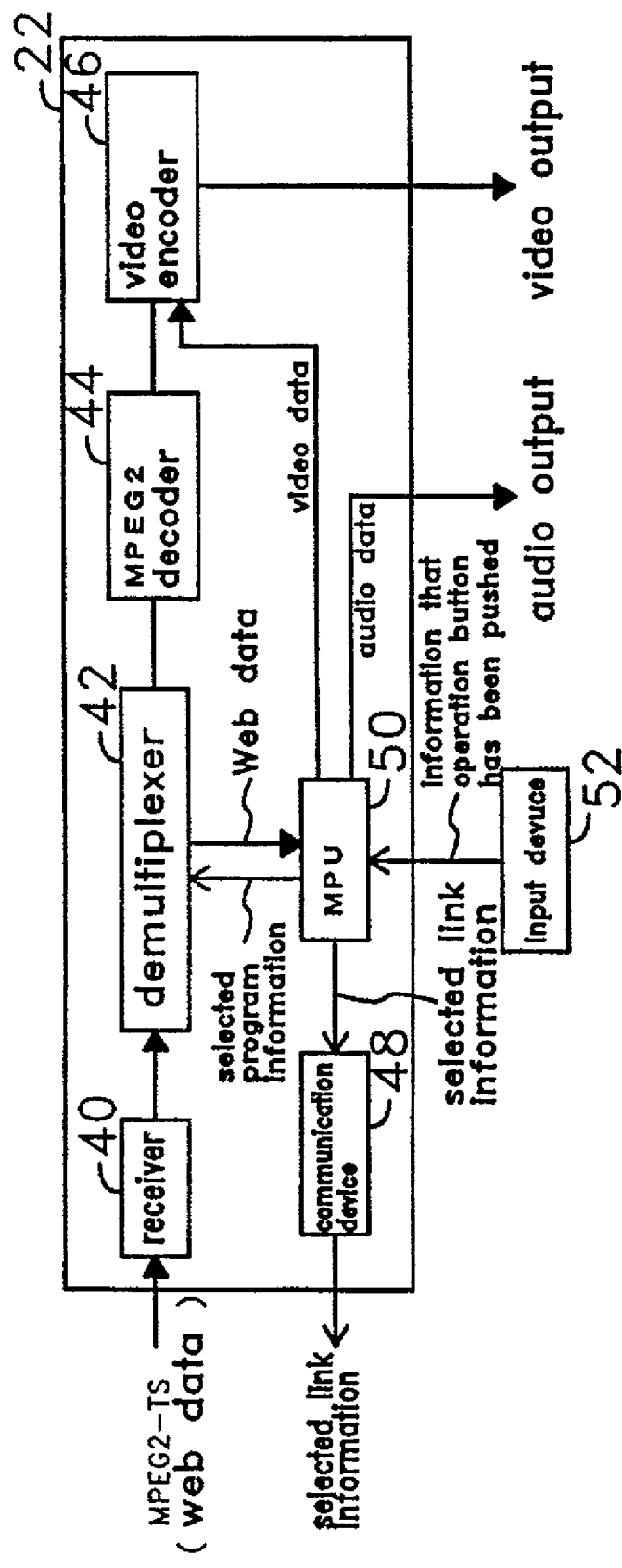
FIG. 11 is a block diagram of a conventional STB in the receiving terminal shown in FIG. 8.

The link information and the video data of the image 80 compressed in accordance with the MPEG 2 standard are combined with other MPEG 2 data, EPG, and the like in the multiplexer 32, and then transmitted from the transmitter 34. An example of the transmitted data (MPEG 2-TS) is shown in FIG. 2(b). The web page 60 is compressed in accordance with the MPEG2 standard after being converted into the video data of the image 80. Therefore, it takes up less file space and can be transferred at higher speed than a conventional web data (HTML file, image file, voice file) shown in FIG. 10(a).

Figure 4:
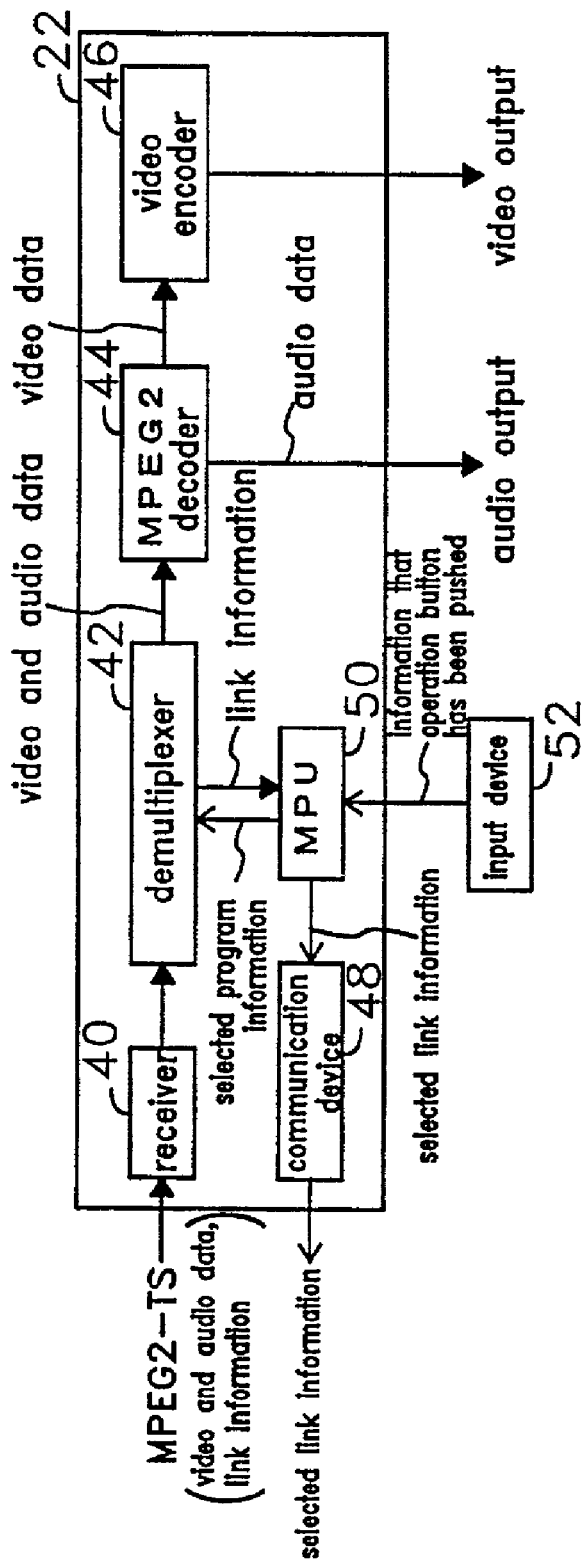
FIG. 4 is a block diagram showing an example of the STB included in the receiving terminal shown in FIG. 1.
Figure 5:
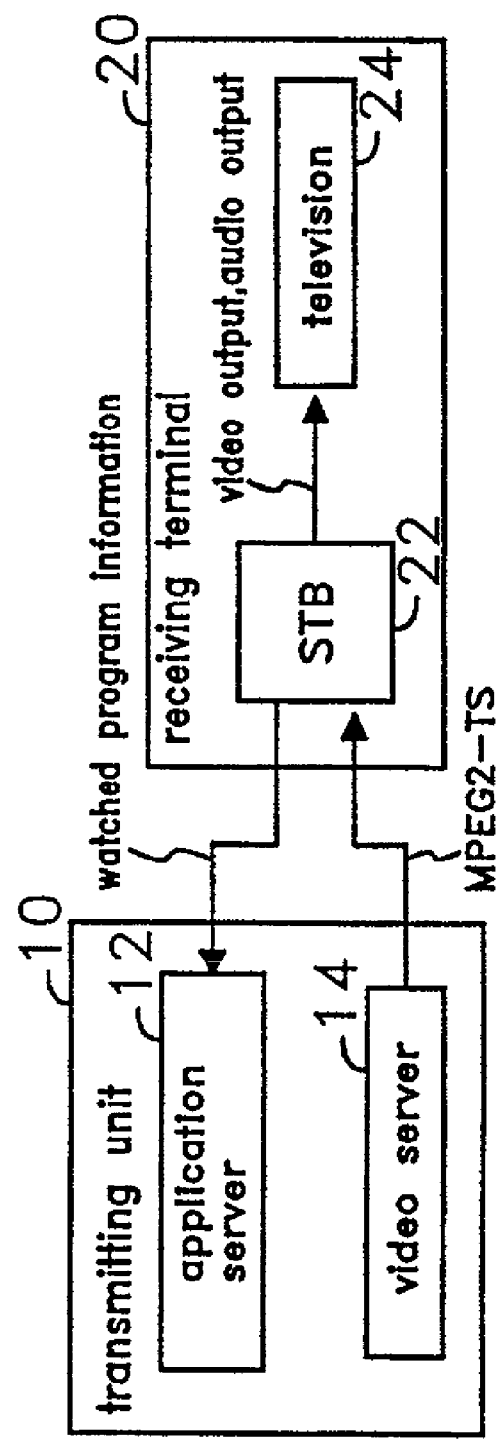
FIG. 5 is a block diagram showing a transmission of a digital broadcast from the transmitting unit to the receiving terminal.
Figures 6A, 6B:
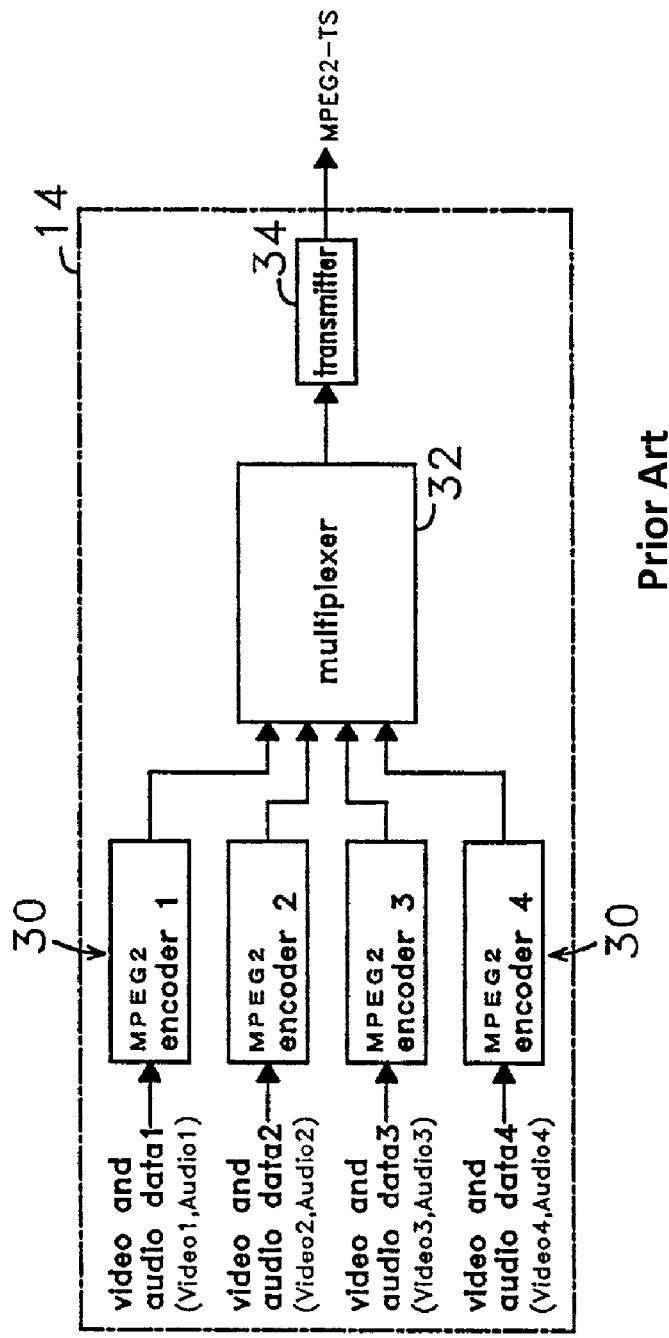
FIG. 6(a) is a block diagram showing an example of a video server in the transmitting unit shown in FIG. 5.
FIG. 6(b) shows an example of an MPEG-TS shown in FIG. 6(a)
Figure 7:
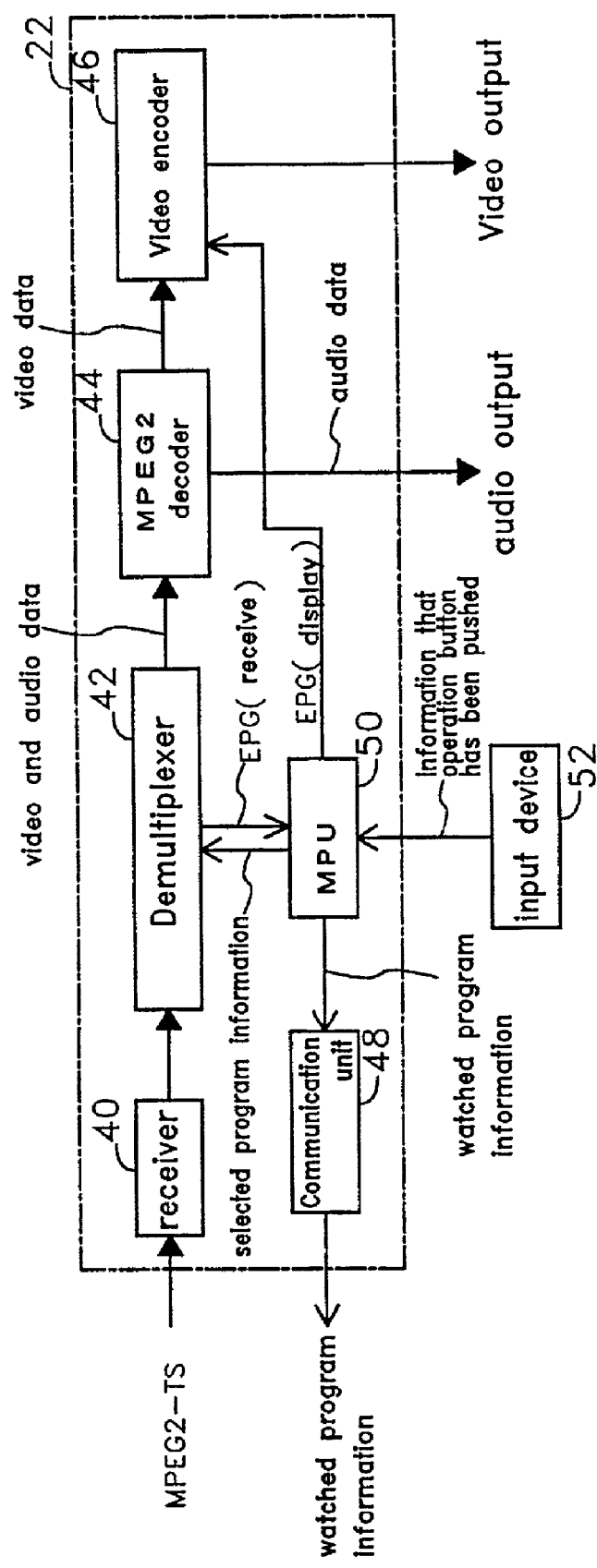
FIG. 7 is a block diagram showing an example of an STB of the receiving terminal shown in FIG. 5.
Figure 12A:
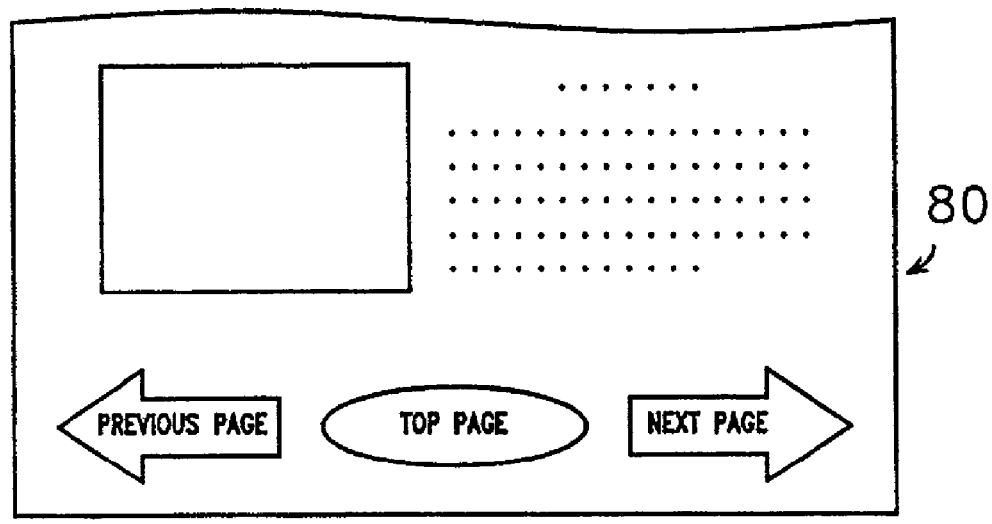
FIG. 12(a) shows an example of an image transmitted from an MPU (Microprocessor unit) of an STB.
Figure 12B:
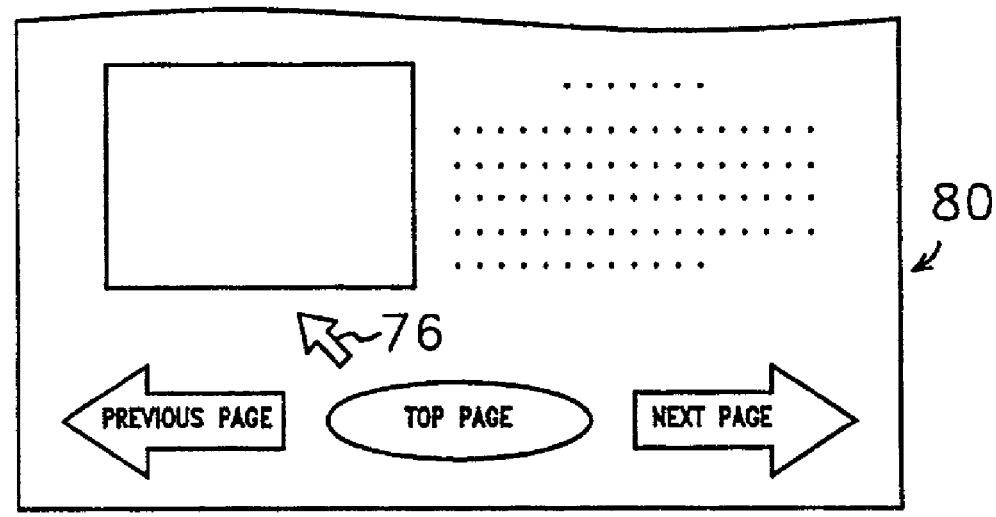
FIG. 12(b) shows an example of video output transmitted from an STB.

As in the case of conventional data, the data MPEG2-TS shown in FIG. 2(b) is received by a receiver 40 in the STB 22, and transmitted to a demultiplexer 42. As shown in FIG. 4, while sending video data and audio data of the image 80 to the MPEG2 decoder 44, the demultiplexer 42 sends link information to the MPU 50. The video data 80 and audio data decoded by the MPEG2 decoder 44 is outputted to the television 24 in the same manner as conventional. The image 80 shown in FIG. 12(a) is displayed on a television screen 24. As shown in FIG. 12(b), the cursor 76 which can be manipulated by the input device 52 in the same manner as conventional is also displayed on the television screen 76.

Since the web page 60 is compressed in accordance with the MPEG2 standard after being converted into the video image data in the transmitting unit 10, it can be reproduced by decompressing it by the MPEG2 decoder 44. The decoder 44 is used for displaying web data, so that there is no need to use a web browser. For this reason, neither a conventional high-speed MPU nor a high-capacity memory is necessary. Thus, the web can be browsed without causing any compatibility problems between MPUs, between OSs and between multiple browser software.

The selection of a link on a web page can be made in the same manner as conventional by comparing a coordinate of the cursor 76 with a coordinate of the area 82, 84, or 86 using the MPU 50. When the user selects a link by moving the cursor 76 using the input device 52, information of the selected link is sent to the transmitting unit 10 via the communication device 48. The application server 12 of the transmitting unit 10 makes a request to the Internet 16 for transferring a web page linked to the selected link. The web page transferred to the application server 12 is transmitted from the transmitting unit 10 to the receiving terminal 20.

While an embodiment of the present invention has thus been described, the present invention can be realized in other embodiments. For example, the present invention is not limited to browsing the Web using a digital broadcast system, but it can be used for browsing the Web using an analog broadcast system. The wave page may include only voice or sound, or it may include only picture. The present invention is not limited to browsing the Web, but it can be used for browsing electronic mails. Also the compressing technique is not limited to the MPEG2 standard, but any compression scheme can be employed in the present invention. The broadcast system of the present invention is not limited to television broadcasting, but it covers two-way communication systems for transmitting and receiving video and/or audio data in a music or movie distribution. The present invention is not limited to wireless communication such as satellite broadcasting, but it can be employed in a cable transmission such as cable broadcasting. Also, a web page can be displayed on a full screen or on a part of a screen. In addition, the present invention can be used in a television conference system, in which an HTML file is used as a shared conference material.

While the embodiments of the present invention have thus been described with reference to the drawings, it should be understood that the present invention be not limited to the embodiments shown in the drawings. Various changes, modifications, and improvements can be made to the embodiments on the basis of knowledge of those skilled in the art without departing from the scope of the invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture comprising a computer usable medium having computer readable program code means embodied therein for causing a function described above. The computer readable program code means in the article of manufacture comprising computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A broadcast system comprising:
  a transmitting unit comprising transmitting unit link areas, the transmitting unit performing:
    receiving a web page as input;
    converting the web page into video image data; and
    providing a link to the video image data on a basis of a link provided to the web page;
  a browserless receiving terminal;
  an encoder performing:
    compressing the video image data in accordance with a predetermined compression scheme; and
    directly transmitting the compressed video data and information about the link;
  a receiving unit comprising a decoder, said receiving unit performing:
    receiving the compressed video data;
    decoding the compressed video data; and
    directly transmitting the decoded video data to a video display device, without requiring a browser application; and
  an application server in the transmitting unit link areas converting a web page transmitted from the Internet into video data of an image and sends the video data, said application server providing links to the image on the basis of a plurality of image links provided to the web page, wherein:
  upon activation of a web browser on the application server, the video data of the image is sent to an MPEG2 encoder of a video server and compressed, whereupon links are set at selected areas of the web page and contour coordinate data of selected link areas are extracted by the application server, each selected link area from said selected link areas being of rectangular shape and described using coordinates of the four vertexes of said each selected area and each selected area is defined in an HTML file, and coordinate data of said each selected area is extracted from the HTML file;
  the link areas are linked to other web pages;
  while extracting coordinate data concerning the selected link areas, the application server generating link information including addresses of web pages linked to the selected link areas, link information containing coordinate data of all the link areas within the web page and addresses of web pages linked to these areas are generated on a basis of coordinate data contained in the HTML file, and sent to a multiplexer of the video server; and the browserless receiving terminal to output the video data of the image to a television; and a microprocessor unit (MPU) of a set top box (STB) establishing an association between the link information of the video data of the image and a position of a cursor in the video data of the image, said browserless receiving terminal comparing a position coordinate of the cursor with coordinates of points included in the selected link areas, when the MPU determines that the position coordinate of the cursor is positioned in any of the selected link areas, the MPU informs a user about changing an appearance of the cursor, and a desired link is selected by moving the cursor using an input device, wherein when the application server sends the video data of the image, the application server extracts the link areas on the basis of the image links provided to the web page, and generates link information including web addresses linked to the image links provided to the web page and data defining the link areas on the image, and combines the link information and the video data of the image compressed in accordance with the MPEG-2 standard with other MPEG-2 data, EPG data in the multiplexer to form multiplexed data, the multiplexed data then transmitted from a transmitter to a demultiplexer;

the demultiplexer sending link information to the MPU while sending video data and audio data of the image to the MPGE-2 decoder;

outputting means for outputting video data and audio data decoded by the decoder to a television in the same manner as conventional television; and displaying the image and the cursor on a television screen, and to manipulate the cursor using an input device, wherein the video image is reproduced without a need to use a web browser, a conventional high-speed MPU, or a high-capacity memory.

2. The broadcast system of claim 1, wherein the link information provided to the receiving unit comprises:

a web address linked to the link provided to the web page; and information about a position of the link provided to the video data in correspondence with a position of the link provided to the web page.

3. The broadcast system of claim 1, wherein the receiving unit is further configured for:

selecting a link provided to the video data transmitted to the video display device; and transmitting information about the selected link to the transmitting unit.

4. The broadcast system of claim 1, wherein the video data comprises audio data when the web page comprises voice or sound.

5. The broadcast system of claim 1, wherein the compression scheme is an MPEG2 standard.

6. The broadcast system of claim 1 wherein the decoder is an MPEG2 decoder.

7. The broadcast system of claim 1 wherein the transmitting unit comprises an application server converting the web page.

8. The broadcast system of claim 1 wherein the transmitting unit comprises a video server.

9. The broadcast system of claim 8 wherein the transmitting unit further comprises a multiplexer establishing an association between link information of the video data and a position of a cursor in the video data.

10. The broadcast system of claim 1 wherein the encoder is embodied in the transmitting unit.

11. The broadcast system of claim 1 wherein the receiving unit further performs:

establishing an association between the link and a position of a cursor in the video data transmitted to the video display device by comparing a position coordinate of the cursor with coordinates of points included in area links linked to other web pages.

\* \* \* \* \*